United States Patent
Bartoldus et al.

(10) Patent No.: US 6,560,227 B1
(45) Date of Patent: May 6, 2003

(54) LAN FRAME COPY DECISION FOR LAN SWITCHES

(75) Inventors: Robert William Bartoldus, Raleigh, NC (US); Brian Mitchell Bass, Apex, NC (US); Timothy Lee Droz, San Jose, CA (US); Scott David Nellenbach, Apex, NC (US); Kenneth H. Potter, Jr., Raleigh, NC (US); Edward Joel Rovner, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/027,860

(22) Filed: Feb. 23, 1998

(51) Int. Cl.$^7$ ................................................ H04L 12/56
(52) U.S. Cl. ........................ 370/390; 370/401; 370/474
(58) Field of Search ................................. 370/473, 474, 370/401, 402, 312, 432, 390, 471, 389, 394, 428, 360

(56) References Cited

U.S. PATENT DOCUMENTS

| | | | |
|---|---|---|---|
| 4,866,702 A | | 9/1989 | Shimizu et al. ................ 370/60 |
| 5,235,592 A | | 8/1993 | Cheng et al. ............... 370/85.4 |
| 5,251,203 A | | 10/1993 | Thompson .................. 370/13.1 |
| 5,327,420 A | | 7/1994 | Lyles ............................ 370/60 |
| 5,327,431 A | * | 7/1994 | Heske, III et al. |
| 5,343,471 A | * | 8/1994 | Cassagnol ................ 370/85.13 |
| 5,390,173 A | | 2/1995 | Spinney et al. ................ 370/60 |
| 5,410,540 A | * | 4/1995 | Aiki et al. ................... 370/390 |
| 5,448,565 A | * | 9/1995 | Chang et al. ................ 370/402 |
| 5,491,687 A | * | 2/1996 | Christensen et al. ........ 370/253 |
| 5,528,590 A | * | 6/1996 | Iidaka et al. ................. 370/395 |
| 5,764,634 A | * | 6/1998 | Christensen et al. ........ 370/389 |
| 5,790,554 A | * | 8/1998 | Pitcher et al. ............... 370/471 |
| 5,793,764 A | * | 8/1998 | Bartoldus et al. ........... 370/390 |
| 5,948,069 A | * | 9/1999 | Kitai et al. .................. 709/240 |
| 5,953,335 A | * | 9/1999 | Erimli et al. ................ 370/390 |
| 5,959,638 A | * | 9/1999 | Forrest et al. ............... 345/511 |
| 6,101,170 A | * | 8/2000 | Doherty et al. ............. 370/255 |
| 6,101,187 A | * | 8/2000 | Cukier et al. ................ 370/396 |

FOREIGN PATENT DOCUMENTS

| | | | |
|---|---|---|---|
| JP | 1122230 | 5/1989 | ........... H04L/11/00 |
| JP | 276340 | 3/1990 | ........... H04L/12/40 |
| JP | 4207649 | 7/1992 | ........... H04L/12/28 |

OTHER PUBLICATIONS

Internetworking with TCP/IP, Comer pp. 92–101, 1995.*

* cited by examiner

Primary Examiner—Ken Vanderpuye
(74) Attorney, Agent, or Firm—Joscelyn G. Cockburn

(57) ABSTRACT

A LAN interconnect device includes a plurality of Frame Processing Units (FPUs) for coupling each port of the device to a switch fabric. Each one of the Frame Processing Units includes an input section with input logic which prepares LS Headers and appends each one to a block of the frame as the block is forwarded to the switch fabric. The FPU, also, includes an output section with copy logic for copying and assembling frames to be forwarded to devices connected to the port. The copy decision is based upon the LS Header and configuration information in the port.

14 Claims, 7 Drawing Sheets

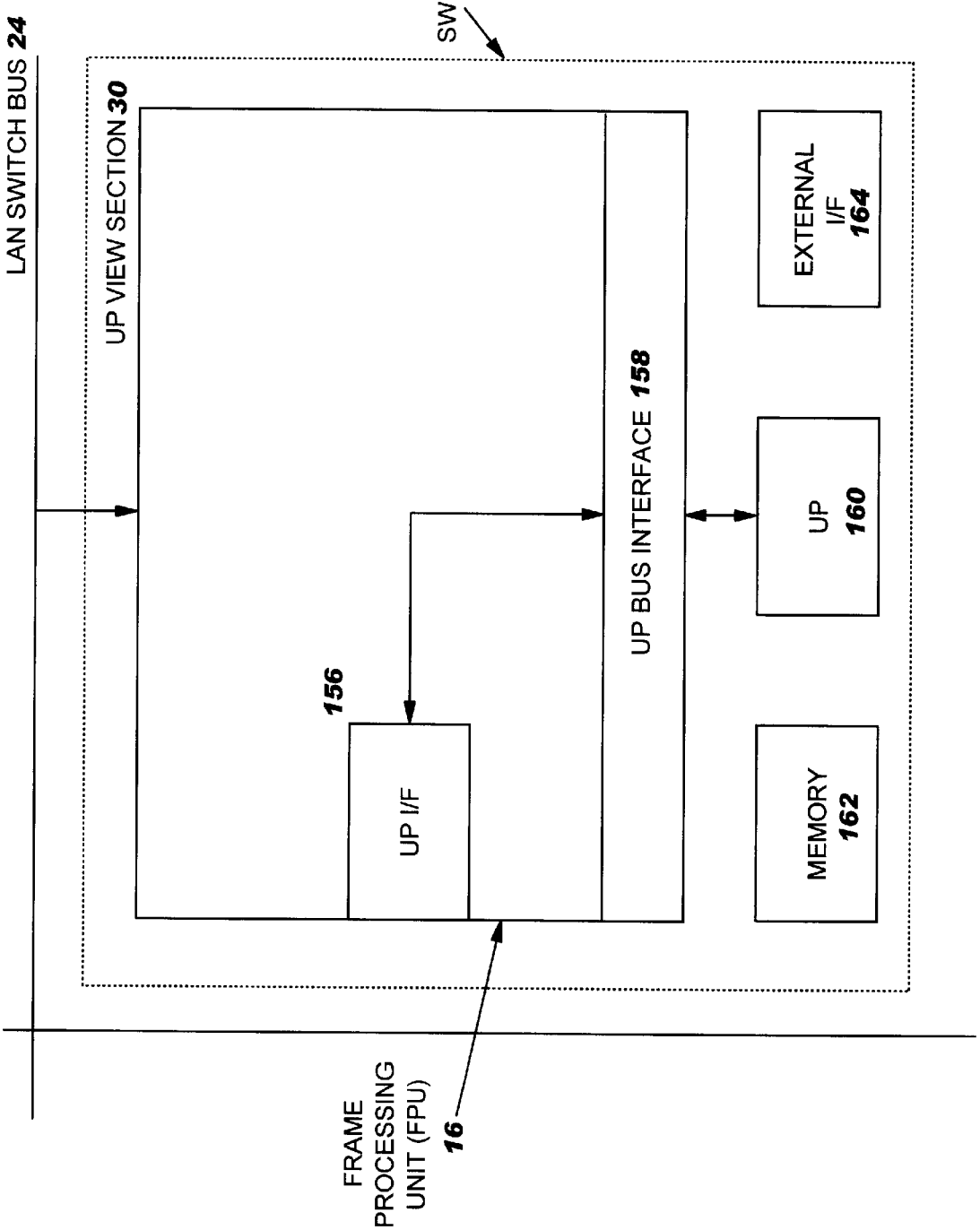

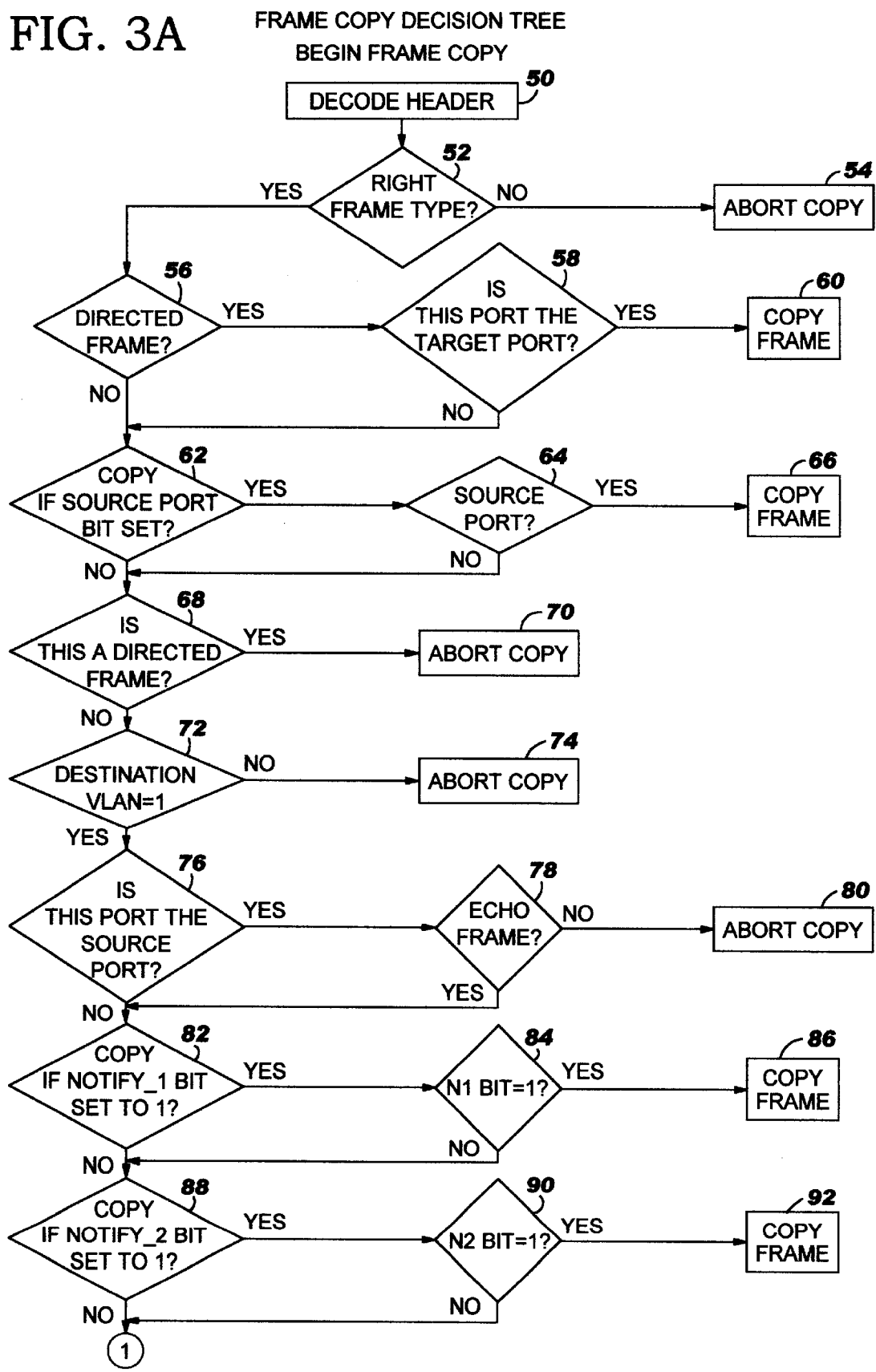
FIG. 3A  FRAME COPY DECISION TREE
BEGIN FRAME COPY

LAN FRAME COPY DECISION FOR LAN SWITCHES

BACKGROUND OF THE INVENTION

1. Field of the Invention

The present invention relates to devices that interconnect LAN segments and/or Data Terminal Equipment (DTE) in general and, in particular, to the type of devices that use switching fabrics to make direct connections between ports in the devices.

2. Prior Art

The use of interconnecting devices, termed (Local Area Network) LAN Switch, for interconnecting LAN segments to enable communications between devices on different LAN segments and/or communication between other devices and servers connected to ports of the LAN Switch is well known in the prior art. A conventional LAN Switch or LAN Switch System includes a plurality of ports connected by dedicated port modules to a switching fabric. Devices on the ports are directly connected via the switching fabric. The attraction for LAN Switches is that they provide point-to-point communication in an environment that would otherwise provide shared media communication. The point-to-point communication is effected between two ports and, as a consequence, the overall performance and throughput of the network are increased.

One of the major problems in a LAN Switch System is determining which ports should be connected together for a given LAN frame to be transported through the LAN switch system. Since a port can be communicating with several other LAN ports over a period of time, the connection decision has to be made on a frame by frame basis and in a timely manner. In the prior art, the decision is made on the input side of the switch port. This requires that each input port knows everything about each output port and, in a multiport switch, the overhead to keep this information grows exponentially.

In order to make a fast decision regarding where to send a frame, large numbers of output port addresses are kept at each input port. The typical LAN switch uses a Contents Address Memory (CAM) and/or equivalent look-up mechanism using some external RAM to store all the output port addresses at each input port. A CAM is used in order to reduce the time needed to determine the port to which the LAN frame is to be sent. Usually an address is matched against an entry in the CAM in order to determine where to route the frame. The CAM has the characteristic of parallel comparison and can output information identifying the output port, hereafter called Port of Exit (POE), if a match occurs. The addition of a CAM at each port increases the cost of the system. In addition, the complexity of the system is also increased, since each CAM has to be updated whenever a new device is added to the network. Consequently, there is a need for a low cost, efficient and simple Routing Device for routing frames in a LAN Switch.

SUMMARY OF THE INVENTION

It is, therefore, an object of the present invention to provide a more efficient LAN Switch System than has heretofore been possible.

It is another object of the present invention to provide low-cost LAN Switch.

It is yet another object to provide a low cost, efficient and simple Routing Device for use in a LAN Switch.

The above and other objects are achieved by providing a LAN Switch with a Routing Device including input logic disposed at the input side of a port and a copy logic disposed at the output side of the port. The input logic builds a LAN Switch Header (LS Header), appends it to a frame and forwards the appended header and frame to the switch fabric. The copy logic is a simple register based compare mechanism that copies frames based upon information in the LS Header and information, termed port configuration, previously stored at the output port. If the frame is copied, it is forwarded to the port associated with the copy logic.

In particular, the input side of the Frame Processing Unit (FPU), at each one of the ports, includes a circuit arrangement or chip (termed a Quad MAC, Medium Access Control) which partitions a LAN frame into segments which are stored in N (N being a numeral) sets of 64 bytes ping pong buffers. The Round-Robin Data Movement System builds a four byte LAN Switch (LS) Header (details set forth below) which is appended to each segment of a LAN frame as it is forwarded to the switch fabric.

The output side of the FPU, at each one of the ports, includes Logic/Compare systems which monitor the LS Header on the switch fabric to decide if a sector is to be copied and forwarded to a particular port. Each port has a dedicated Logic/Compare system connected to the switch fabric and makes a copy or no-copy decision based upon the algorithm set forth below. A Copy-In Logic Circuit writes all copied segments into a Packet Memory and generates a Buffer Table with entries indicating the locations of segments in the Packet Memory. A Play-Out Logic Circuit uses the contents in the Buffer Table to move segments of data from the Packet Memory to ping pong data buffers to the Quad MACs and to dedicated ports connected to said Quad MACs.

One important feature of the present invention is that a common chip design is used at each port of the switch system. By using a common chip design, the overall cost of the switch is further reduced.

The present invention provides several benefits including the following:

The Switch System does not require a CAM device (or equivalent external memory lookup function), thus reducing system costs by allowing simple register based compare logic.

The Switch System does not require each input port to know about each output port, thus reducing costs and complexity.

The Switch System allows the output port to know many different aspects about its attached devices without causing significant system overhead.

Many different programmable options exists for configuring an output port for frame copying. These options allow the LAN Switch System to support diverse LAN devices including (Token-Ring, Ethernet, FDDI, etc.), Microprocessors, Broadcast Frame processors, Virtual LANs, RMON, etc.

Copy decision is made very quickly, therefore, reducing any frame latency through the switch.

Since each LAN frame is transferred on the LS Bus, it is easy to implement a "point-to-multipoint" connection or a frame monitoring function.

The logic required to implement this copy decision process is very cost effective and easy to implement.

The foregoing and other features and advantages of the invention will be more fully described in the accompanying drawings.

BRIEF DESCRIPTION OF THE DRAWINGS

FIGS. 3A, 3B and 3C show a flowchart of an algorithm used to make a copy/no-copy decision according to the teachings of the present invention.

DETAILED DESCRIPTION OF THE PREFERRED EMBODIMENT

Figure 1:
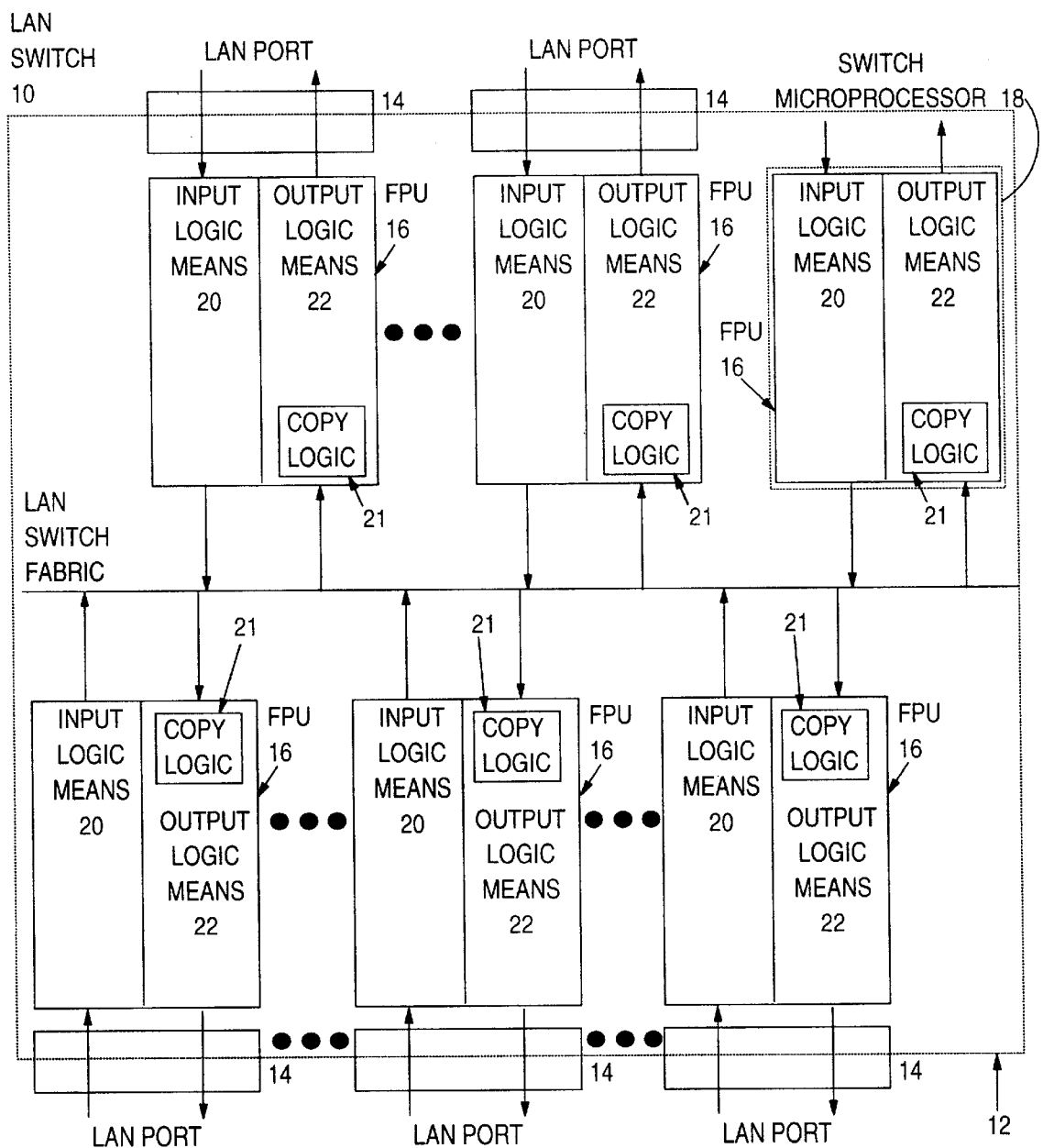
FIG. 1 shows a block diagram of the LAN Switch according to the teachings of the present invention.

FIG. 1 shows a block diagram of the network interconnecting unit, termed LAN Switch, according to the teachings of the present invention. The LAN Switch 10 includes a casing or housing 12 in which a plurality of connectors 14 are mounted. The connectors 14 are used for attaching LAN segments, DTE (Data Terminal Equipment, such as servers, word processors, computers or the like) to the LAN Switch System 10. The position of each of the connectors in the housing designates a LAN port to which a DTE or LAN segment can be connected. The direction of signal flow at each LAN port is designated by the respective arrows. It should be noted that the number of LAN ports and associated Frame Processing Units (FPUs) vary and the dots within LAN Switch 10 indicate that additional LAN Ports and FPUs can be added to the LAN Switch 10. Each of the LAN Port 14 is connected by Frame Processing Unit (FPU) 16 to the LAN switch fabric. The LAN switch fabric provides the switching capability that allows connection between the respective ports of the LAN switch. Any type of switching matrix can be used for the LAN switch fabric. In the preferred embodiment of this invention, the LAN switch fabric is a high performance bidirectional bus. A controller, termed Switch Microprocessor 18, provides the management function for the LAN Switch System 10. The Switch Microprocessor is connected to the LAN switch fabric.

Still referring to FIG. 1, it should be noted that the FPUs that couple LAN ports to the LAN switch fabric are identical. Likewise, the FPU forming the Switch microprocessor are identical. This being the case, the entire LAN Switch 10 can be manufactured from one type of module (details to be given subsequently) for port connection and another type of module for the microprocessor. As a consequence, the design for the LAN Switch of the present invention is made simple and low cost. Both characteristics are important features of the present invention. Each of the Frame Processing Units includes Input Logic Means 20, Copy Logic Means 21, and Output Logic Means 22. The Input Logic Means 20 processes frames received from its associated port and forwards the frame to the LAN switch fabric. The Copy Logic Means 21 decides if the frame is intended for any of the associated output ports. The Output Logic Means , 22 processes frames copied from the LAN Switch Fabric and sends the frame to the appropriate LAN port. As will be explained in more details below, the Input Logic Means 20 includes logic/circuit arrangement which generates headers which are attached to segments of the LAN frame as they are outputted on the LAN switch fabric. The Copy Logic Means 21 uses these headers along with configuration information to decide if the frame needs to be copied by this Copy Logic Means. Once the frame is copied, the headers are removed and the Output Logic Means 22 sends the LAN frame to the output port.

Figure 2A:
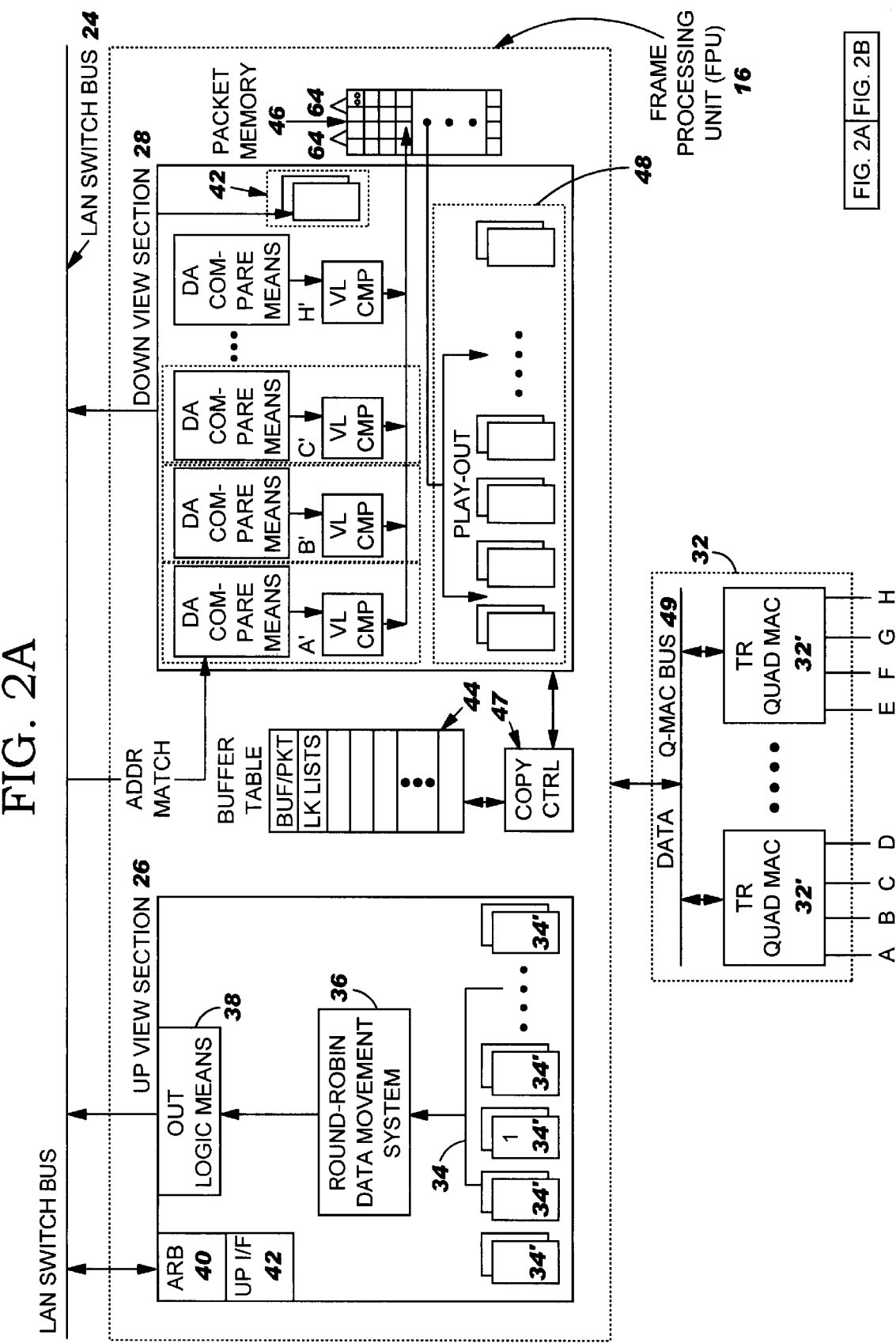
FIG. 2, consisting of FIGS. 2A and 2B, shows details of the Frame Processing Unit (FPU) according to the teachings of the present invention.

FIGS. 2A and 2B show detailed block diagrams for the Frame Processing Unit (FPU) 16 and Switch Microprocessor according to the teachings of the present invention. Since the Frame Processing Units are identical, only one is shown in FIG. 2A connected to LAN Switch Bus 24. It should be noted that in a design of a LAN Switch, such as the one shown in FIG. 1, a plurality of Frame Processing Units 16 designed in accordance with FIG. 2A would be connected to the LAN Switch Bus 24. In addition, the description of the FPU, FIG. 2A, is equally applicable to all the FPUs in the LAN Switch. The FPU 16 includes Up View Section 26, Down View Section 28, and Microprocessor (UP) View Section 30. It should be noted that the sections provide interconnection between a port and the switch fabric and a connection for the microprocessor which manages the Switch. With reference to FIGS. 1 and 2A for the moment, up view section 26 would be implemented in the Input Logic Means 20. Similarly, down view section 28 would be implemented in the Copy Logic Means 21 and Output Logic Means 22. Stated another way, the up view section 26 processes frames from a LAN or the like to the LAN Switch Bus 24. Similarly, down view section 28 processes frames from the LAN Switch Bus 24 and outputs them on devices connected to its output ports. The microprocessor section 30 would be used to provide microprocessor connections to both the (LS) LAN Switch Bus and memory mapped locations contained in the LAN SWITCH.

Still referring to FIG. 2A, the UP View section 26 includes network interface means 32 for connecting to a plurality of Token Ring (TR) LANs (not shown) via transmission media A through H. The network interface means 32 includes a Q-MAC bus connected to a plurality of TR Quad MAC 32'. The TR Quad MAC 32' is an interface chip which connects four Token Ring LANs or LAN Segments (not shown) via conductor A, B, C, and D. Likewise, TR Quad MAC 32' is a Token Ring chip which provides connectivity to four Token Ring LANs or LAN Segments over transmission media E, F, G, and H. Each of the TR Quad Macs provides circuit arrangement and functions that meet the requirement and protocol set forth in the IEEE 802.5 standard for Token-Ring LAN. Such standard are well known in the art and a detailed description is not required. Suffice it to say, that the TR Quad MAC chips contain all the necessary circuitry to interface to four 802.5 LANs and appropriate circuitry to send and receive Token-Ring frames between the Quad MAC and the FPU using the Q-MAC Bus 49 including data and address buses, respectively. The TR Quad MAC provides a cost and space savings means to connect to several Token-Ring ports to the FPU device. Still referring to FIG. 2A, the outputs from the TR Quad MAC are supplied to Quad Mac Bus, a 32 bit data bus. Included in each of the Quad MAC is segmentation logic functions (not show) that partition each Token Ring frame into 64 bytes which are stored in storage subsystem 34. In one embodiment of the present invention, the storage subsystem 34 includes N sets of 64-bytes ping pong buffers 34'. Of course, other buffer sizes and different types of buffering techniques can be used without deviating from the scope and spirit of the present invention. A Round-Robin Data Movement System 36 (details to be given below) moves data from an active ping pong register pair and attaches a LAN Switch Header (LS Header) to form Data Units that are transferred to Out Logic Means 38. The Out Logic Means 38 transfers the Data Unit to the LAN Switch Bus 24. An Arbitrator (ARB) 40 which provides access to the bus is provided in the Up View Section 26. A Microprocessor Interface ($\mu$P I/F) 42 for communicating with Microprocessor is also provided in the Up View Section 26.

Referring again to FIG. 2A, the Up View Section 26 receives a frame from a LAN, processes the frame, and outputs the frame on the LAN Switch Bus for copying by the appropriate Down View Section 28. In the preferred embodiment of the invention, the LAN Switch Bus 24 includes 32 bits of Data, Data Parity, ARB Sync, Request signal line, Chunk Active signal line, Address Match Signal Line, Suspend signal line and a Clock line. The Data signals carry the frame data from one FPU to another. The Data Parity signals are used to protect the Data signals from undetected errors by providing a means to check the parity for each data word against its expected value. The ARB Sync signal is used to time events on the LS Bus, and is the signal that indicates the start of each new arbitration sequence. The Request line is used to indicate use of the LS Bus. If a FPU does not have any data to transfer, it will not activate its Request signal. The Chunk Active signal is used to indicate when data is being transferred across the LS Bus. The Address Match signal is used to indicate that a FPU has matched the address contained within the current frame being sent across the LS Bus. The Suspend signal is used to temporarily suspend transfers across the LS Bus.

The Round-Robin Data Movement System 36 generates the LAN Switch Header (LS Header) and appends the LS Header to each of the 64 bytes data segments. The Out Logic Means 38 forwards the LS Header and data segment to the LAN Switch Bus (LS Bus). Each Output Port has Copy Logic Means 21 including Down View Section 28 monitoring the LS Bus and looking at each segment of a frame plus the appended LS Header as it is transferred to determine if the frame segment should be copied and forward to the Output Port. The Copy Logic Means uses the LS Header and its configuration information to make the copy and forwarding decision. The Round-Robin Data Movement System 36 includes logic to generate the LS Headers, save the last ping-pong buffer serviced, determine the next ping-pong buffer to service, and logic to move the data to the Out Logic Means. The Out Logic Means includes logic to ask for the LS Bus and determine when the FPUs turn on the bus occurs, and logic to move the LS Header and Frame data onto the LS Bus once the FPU's turn on the bus arrives.

Figure 4:
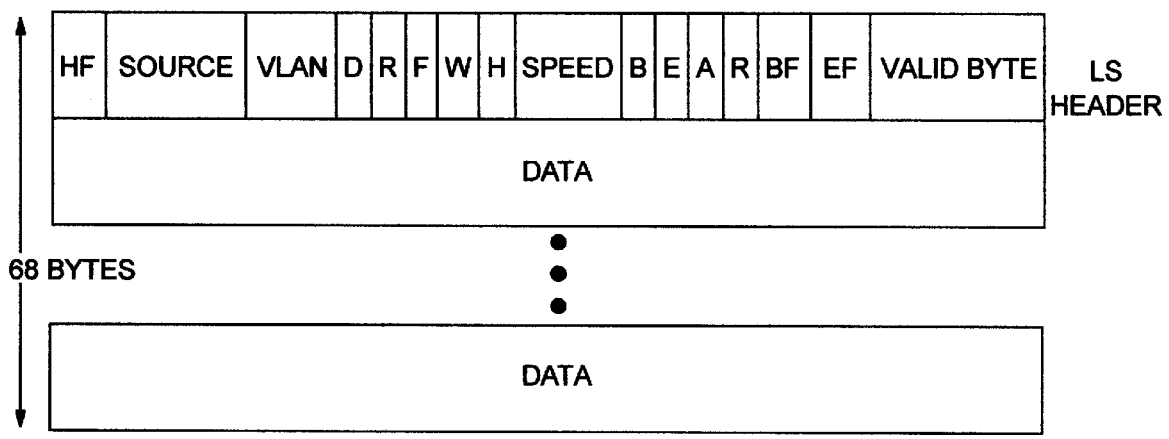
FIG. 4 shows a graphical representation of the Switch Data Unit (SDU) used to transport LAN frames through the Switching System.

FIG. 4 shows a graphical representation of the Switch Data Unit which is outputted on the LAN Switch Bus 24. The Switch Data Unit includes 68 bytes of information comprising of the LS Header section of 4 bytes (generated by the Round-Robin Data Movement System 36) and 64 bytes data which is a segment of a LAN frame. As is shown in FIG. 4, each field is identified by a symbol that is defined in Table I and Table II below. With respect to Table I, the symbol for each field of FIG. 4 is listed in the Symbol column. The bits allocated to the particular symbol is shown in the Bit column and the definition for each symbol is shown in the Definition column.

TABLE I

| Symbol | Bits | Definition |
| --- | --- | --- |
| HF | 1 | Header Format indicator |
| Source | 7 | Source Port Number |
| VLAN/Port | 8 | Virtual LAN ID or Target Port Number |
| D | 1 | Directed Frame indicator |
| r | 1 | Reserved |
| F | 1 | Forward Frame indicator |
| W | 1 | Notification indicator #1 |
| H | 1 | Notification indicator #2 |
| Speed | 3 | Source Port Speed indicator |

TABLE I-continued

| Symbol | Bits | Definition |
| --- | --- | --- |
| B | 1 | Indicates beginning of frame is being transmitted |
| E | 1 | Indicates end of frame is begin transmitted |
| A | 1 | Indicates frame should be aborted |
| r | 1 | Reserved |
| BF | 1 | Broadcast Filtering has been done |
| EF | 1 | Explorer Filtering has been done |
| Valid Byte | 2 | Indicates how many bytes are valid |

As discussed above, the present invention generates the LS Header which is appended to frame segments to form the Switch Data Unit. The LS Header is used by the Copy Logic Means 21 to copy or not copy a switch data unit from the LAN Switch Bus 24. Table II below sets forth a more detailed description of the LS Header format including bit allocation and symbols from FIG. 4. As is evident from the description the LS Header has several fields. With respect to Table II, the fields are identified by alphabetical characters A through N. The first line in each field defines the name of the field and the number of bit(s) in that field and the following lines describe the field and its function. The symbols from FIG. 4 and Table I are also needed. For example, the first line of a field in Table II defines a 1-bit field named Header Format—HF (HF being the symbol). The setting of the bit identifies the Frame type. If the bit is set to logical "0," the Frame is a LAN Frame. Likewise, if the bit is set to logical "1" the Frame a Non-LAN Frame. A similar approach is used to map and interpret the other fields in Table II. It should be noted that only thirty of the thirty-two bits (4 bytes) of the LS Header are used. The unused two bits are reserved for future use.

TABLE II

A. Header Format-HF (1 bit)
0 = LAN Frame Header (shown below), 1 = Non-LAN Frame
This value is used to allow expansion of the LS Header for non-LAN data transfers.
B. Source Port Number-Source (7 bits)
The unique number assigned to each input port.
C. Virtual LAN (VLAN) ID or Target Port (8 bits)
This field indicates VLAN ID or Target Port ID. As a VLAN ID: used to assign the Virtual LAN ID value for the source port. As a Target Port Number: used by the Switch Processor to direct this frame to a given output port.
D. Directed Frame-D (1 bit)
0 = Use above C field as VLAN ID, I = Use above C field as Target Port Number.
E. Forward Frame - F (1 bit)
0 = LAN ports will not forward these frames, 1 = LAN ports look at these frames for forwarding.
F. Notify 1 - W (1 bit)
Copy notification #1 value, used to allow software to setup programmable copy decisions.
G. Notify 2 - H (1 bit)
Copy notification #2 value, used to allow software to setup programmable copy decisions.
H. Source Port Speed-Speed (3 bits)
000 => Frames from this port must be Stored and Forwarded
    Intermediate values indicate relative speeds
    Example, 001 = 4 Mbps, 010 = 10 Mbps, etc.
111 => Highest Speed available
If the Source Speed >= Destination Speed, then Cut Through is allowed
I. Begin-B (1 bit)
0 = Not beginning frame, 1 = Beginning of frame
J. End-E (1 bit)
0 - Not end of frame, 1 = End of frame
K. Abort-A (1 bit)
0 = Frame should not be aborted, 1 = Frame should be aborted
L. Broadcast Filtered-BF (1 bit)

TABLE II-continued

0 = Frames have not been Broadcast Filtered, 1 = Frames from this port already have had Broadcast Filtering performed
M. Explorer Filtered-EF (1 bit)
0 = Frames have not been Explorer Filtered, 1 = Frames from this port already have had Explorer Filtering performed
N. Last transfer valid bytes-Valid Bytes (2 bits)
00 = All valid, 01 = Least significant byte valid, 10 = Least significant half word valid, 11 = Lower 3 bytes valid Most of the values for the LS Header can be copied from configuration registers associated with each input port. The VLAN ID, Forward Frame, Notification 1 and 2, Speed, Broadcast and Explorer Filtered values are direct copies of configuration parameters. The Begin, End and Abort bits are set by the Input Port Logic based upon the current portion or segment of the LAN frame that is being transferred. Based upon the above detailed description, it is within the skill of one skilled in the art to design an appropriate Round Robin Data movement System to generate the LS Header.

Referring again to FIG. 2A, the down view section 28 includes Token Ring (TR) interface means 32 connected to a plurality of transmission conductors A through H. Each of the conductors A through H represents a port which is connected to a LAN which practices the Token Ring protocol.

Even though the present invention has been described with Token Ring LANs connected to FPU 16, this should not be construed as a limitation on the scope of the present invention because it is well known within the skill of one skilled in the art to attach other types of LANs without deviating from the spirit or scope of the present invention. Other types of LANs which could be attached includes ethernet, IEEE 802.3, etc. It should also be noted that the Q-MACs would change accordingly to be compatible with the LAN.

Still referring to FIG. 2A, a plurality of copy logic means A' through H' are connected to the LAN Switch Bus 24. Each of the copy logic means is associated with an output port and makes the copy or not to copy decision for the port with which it is associated. With reference to FIG. 2A, copy logic means A' would copy or not copy frames for Port A (connected to TR Quad MAC 32' and labeled A). Likewise, copy logic means B' copies or not copies frames for Port B, and so forth. It should be noted that the number of ports on the Down View Section 28 are arbitrary. The showing in FIG. 2A is for the purpose of describing the invention and should not be construed as a restriction on the scope and/ or teachings of the present invention.

Still referring to FIG. 2A, the copy logic means for each port is identical and only one will be described. Each of the copy logic means includes a DA compare logic means connected to a Virtual LAN (VL CMP) Compare Logic Means. A ping pong storage facility 42 stores frames as they are pulled off from the LAN Switch Bus. In the preferred embodiment of the invention, the ping pong storage facility has a storage capacity of 64 bytes. A Packet Memory 46 stores data from the ping pong storage. The buffer table 44 is provided with information indicating the location in the packet memory where the information is stored. Once the Copy Logic means has determined that the frame should be copied off the LS Bus, internal state machines are activated to move the data into Packet Memory 46 and store descriptive information, such as memory location etc., in Buffer Table 44 in order to track the frame's location in the Packet Memory. The descriptive information is subsequently used to remove the data by the Play Out means into ping pong storage buffers 48 from whence the data is removed through the TR Quad means interface 32 to the appropriate port.

It should be noted that each output port logic means including the Down View Section 28 that is connected to the LAN Switch Bus monitors the bus looking at each frame segment as it is transferred to determine if the frame segment should be copied and sent to the output port. In order to make a copy decision, the copy logic means for each output port looks at the LS Header and frame data to determine if the frame should be copied into local storage. The copy decision is based on the information in the LS Header along with the output port's configuration. The output port configuration is set forth in Table III, below.

TABLE III

| | |
|---|---|
| MAC address register (48 bits) | This register is compared to the DA or SA field in the LAN frame to determine if the frame should be copied (multiple sets of this register can exist to support more than one attached station). |
| Destination bridge/ring number (16 bits) | This register is compared to the routing information field (RIF) in a Token Ring LAN frame to determine if the frame should be copied. The RIF is optional in a frame and its presence is indicated by one bit in the source address field. The RIF is "scanned" as the frame is copied from the LS Bus. The direction bit in the RIF header determines the possible locations of the bridge and ring numbers in the RIF. Also, the RIF header indicates the length of the RIF (again, multiple sets of this register may exist). |
| Source monitor register (7 bits) | This register is compared to the source port number in the LS Header to determine if the frame should be copied. This function is done only if the "Copy if Source Port Match" (defined below) bit is set. |
| Copy if DA match (1 bit) | Used to enable the DA match condition, allows dedicated station(s) attachment. |
| Copy if RI match (1 bit) | Used to enable the RI match condition, allows downstream bridge(s) attachment. |
| Copy if all stations address (1 bit) | Used to enable All Stations Address copy decision. |
| Copy if group address (1 bit) | Used to enable Group Address copy decision. |
| Copy if functional address (1 bit) | Used to enable Functional Address copy decision. |
| Copy if All Routes Explorer (1 bit) | Used to enable All Routes Explorer (ARE) frame copy decision. |
| Copy if Spanning Tree Explorer (1 bit) | Used to enable Spanning Tree Explorer (STE) frame copy decision. |
| Copy all (1 bit) | Used to pass all frames to a monitor function or a shared segment. |
| Copy if notify 1 (1 bit) | Used to capture frames with the W bit set by source, allows software to define programmable copy decision. |
| Copy if notify 2 (1 bit) | Used to capture frames with the H bit set by source, allows software to define programmable copy decision. |
| Copy if source port match (1 bit) | Used to capture frames generated from a particular source port. |
| Destination VLAN bitmap (256 bits) | The bitmap indicates for each possible VLAN number, whether the LAN frame should be copied by this port. Up to 256 VLANs can be defined using a 256 bitmap. The VLAN bitmap can be expanded, if needed. |
| Destination speed (3 bits) | These bits indicate the relative speed of the destination. It is compared to the source speed passed in the LS Header and if the source is greater than or equal to the destination, this indicates that Cut-Through should be performed on this LAN frame. The value of 000 can be used to indicate that this port does not support Cut-Through at all. |
| Echo frames (1 bit) | Used to allow or prevent a port from receiving frames where it was the source port. |

TABLE III-continued

| | |
|---|---|
| Header only (1 bit) | Indicates that when frame is copied, only the first transfer is stored. This bit is used to implement a monitoring function, as well as for MAC address learning function. |
| Destination priority (3 bit) | These bits are used to indicate at which priority frames go into high or low priority queues for this port. It is compared to the priority field in the Frame Control Field of Token Ring frames. If the frame is greater than this setting, then that frame gets put into the high priority queue. |
| Expected Broadcast Filtered Bit (1 bit) | Used to determine if a broadcast frame should be copied. If the expected value matches the value in the header, than the frame should be copied. |
| Expected Explorer Filtered bit (1 bit) | Used to determine if an explorer frame should be copied. If the expected value matches the value in the header, then the frame should be copied. |

Figure 3B:
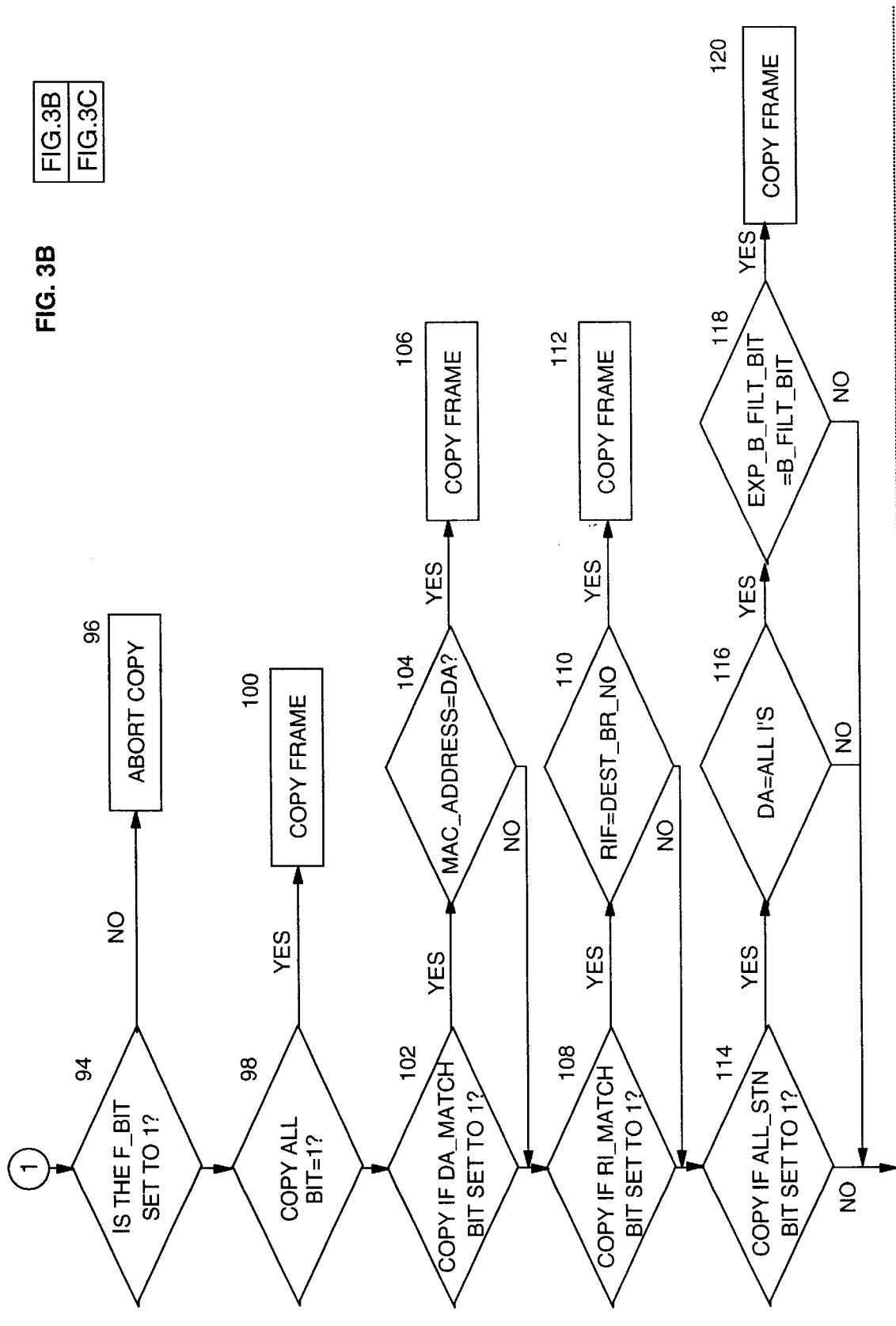
Figure 3C:
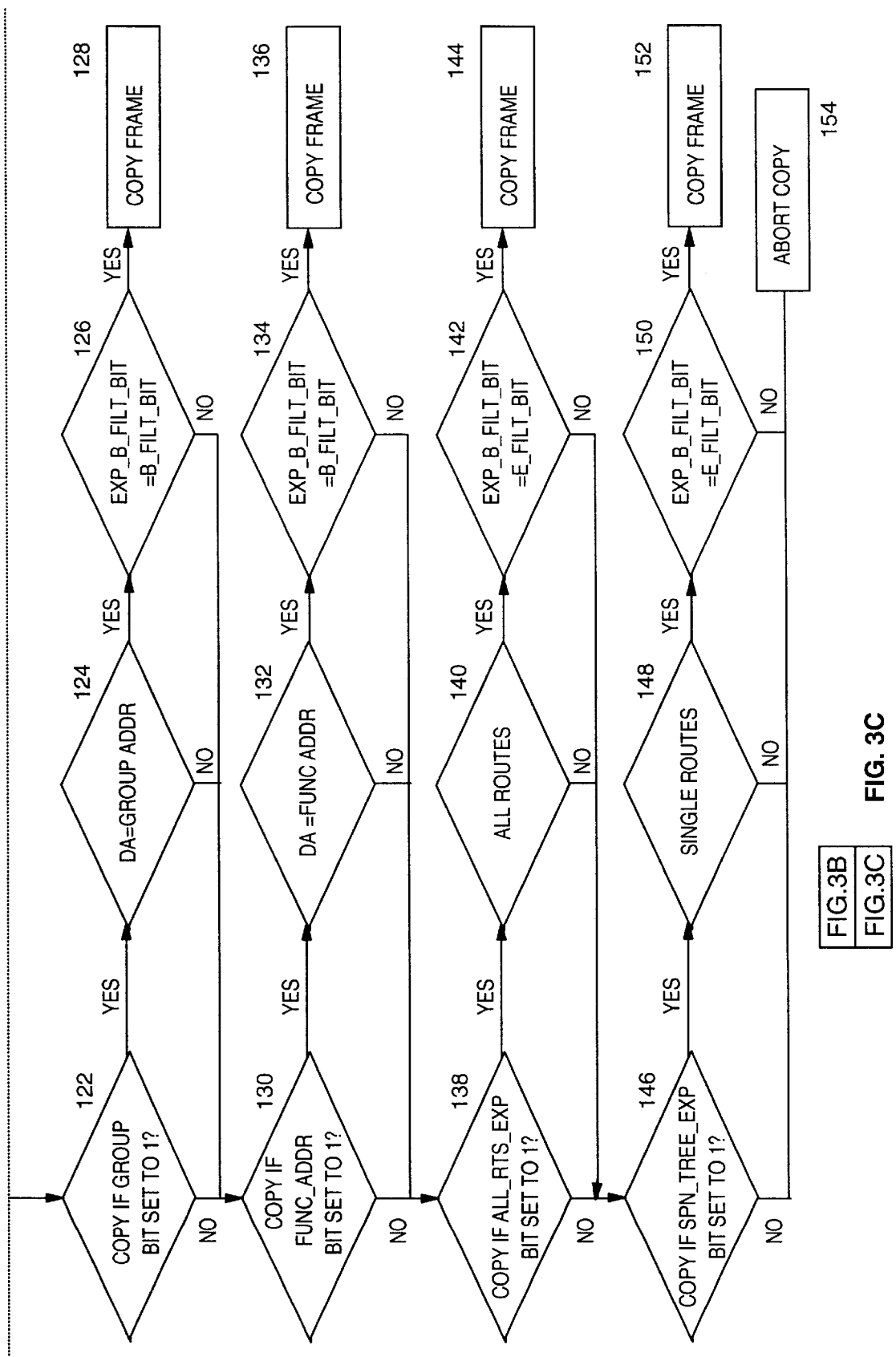

The Copy Logic means looks at different parts of the data and LS Header (described above) simultaneously to determine if the LAN frame should be copied. The copy decisions are based on the information set forth in TABLE III, above. A flowchart of the Copy Decision Tree is shown in FIGS. 3A, 3B and 3C. Likewise, the pseudo code in TABLE IV below shows the Copy Decision Tree.

With reference to FIG. 3A, the first step in the decision tree is to decode the header block 50. The algorithm then descends into block 52 where it tests to see if the right frame type was received. If the frame type is incorrect, the algorithm aborts copying block 54. If the right frame type was received, the algorithm descends into decisional block 56 where it tests to see if it is a Directed Frame. As is used herein, a Directed Frame is a frame that is directed to a specific output port. The desired port number is located in the LS Header. If the frame is a Directed Frame, the algorithm enters decision block 58 where it tests if the port number located in the header matches the target port. If the port matches the target port, the frame is copied, block 60. If the port is not a target port, the algorithm enters decision block 62. The algorithm tests, in block 62, if the source port copy bit is set. If it is, the algorithm enters block 64 where it tests to see if it is the appropriate source port and then copies the frame, block 66, if the result is yes. If the source port bit is not set or this is not the appropriate source port, the algorithm descends into decision block 68 where it tests to see if this is a directed frame. If it is a directed frame this port must not be the correct port and the algorithm aborts copying, block 70. If it is not a directed frame, the algorithm descends into decision block 72 where it tests to see if destination VLAN is set. As is used in this application, destination VLAN means a set of destination ports that have been grouped together to form a specific group. If in block 72, destination VLAN is not set, the port does not copy the frame as shown in block 74. If destination VLAN is set, the algorithm descends into decision block 76 where it tests to see if the port is the source port. If the port is the source port, the algorithm then enters decision block 78 where it tests to see if the frame is an echo frame. As is used in this application, echo frames means a frame that is sent back to the source port. If the frame is not an echo frame, the port aborts copying, block 80. If the port is not the source port, block 76, or the frame is an echo frame, block 78, the algorithm descends into block 82. In block 82, the algorithm tests to see if the first notification bit is set. If it is, the algorithm enters block 84 where it tests to see if the N1 bit equals 1, and if so, the frame is copied, block 86. If the notification bit 1 is not set, or the N1 bit does not equal 1, the algorithm then enters decision block 88 where it looks on notification bit 2 to see if it is set. If it is, the algorithm enters block 90 where it tests to see if the N2 bit equals 1, and if so, the frame is copied, block 92. If notification 2 is not set or the N2 bit does not equal 1 (blocks 88 and 90), the algorithm exits FIG. 3A at Node 1. The two notification bits are used to allow the system software to send frames to specific ports or sets of ports by just setting the notification bits and having the appropriate ports copy the frames.

Referring to FIGS. 3B and 3C, the algorithm enters block 94 where it tests to see if the F bit is set. If the F bit is not set, the frame is not copied, block 96. As is used in this application, the F bit is used to enable LAN forwarding of frames. The algorithm then descends into block 98 where it tests to see if the copy all bit is set. If the copy all bit is set, the algorithm enters block 100 and copies the frame. If the copy all bit is not set, the algorithm descends into decision block 102 where it checks to see if the DA match bit set. If the DA match bit is set, the algorithm enters block 104 where it tests to see if the MAC address equals the received DA address. If it is, the frame is copied, block 106. If the MAC address is not equaled to the DA address or the DA match bit is not set, the algorithm descends into decision block 108. In decisional block 108, the algorithm checks to see if the R1 match bit is set. If the RI match bit is set, the algorithm enters block 110, where it checks to see if the Routing Information Field (RIF) contains the destination bridge number. If the RIF contains the destination bridge number, the frame is copied, block 112. The RIF of a Token-Ring frame is used to route the frame through the network. If this port is part of that path, it will have a matching destination bridge number somewhere in the RIF and should copy the frame.

If the RI match bit is not set in block 108 or the RIF does not contain the destination bridge number, block 110, the algorithm descends into block 114. In block 114, the algorithm checks to see if the all station bit is set. If it is, the algorithm enters block 116, where it tests to see if a destination address is equal to all 1's. If it is, the algorithm then enters block 118, where it checks to see if the expected broadcast filtered bit is equal to the broadcast filtered bit sent with the frame. If it is, the algorithm copy the frame, block 120.

Still referring to FIGS. 3b and 3C, if the responses in block 114, block 116, or block 118 are negative, the algorithm then descends into block 122. In block 122, the algorithm checks to see if the group bit is set. If it is, the algorithm then enters block 124, where it checks to see if the DA address is a group address. If the DA address is a group address, the algorithm then enters block 126, where it tests if the expected broadcast filtered bit is equal to the broadcast filtered bit sent with the frame.

If the result in block 126 is positive, the frame is copied, block 128. If the responses from block 122, block 124, or block 126 are negative, the algorithm descends into block 130. In block 130, the algorithm tests to see if the copy function address bit is set. If it is set, the algorithm enters block 132 where it tests to see if the destination address is equal to a functional address. If it is, the algorithm then enters block 134 where it performs the test previously described in blocks 118 and 126, respectively. If the result from block 134 is true, the algorithm then copies the frame, block 136. If the responses from block 130, 132 or 134 are negative, the algorithm enters block 138. In block 138 the algorithm checks to see if the all routes explorer bit is set. If the response from block 138 is positive, the algorithm enters block 140 where it checks to see if the frame is an all routes explorer frame. If the frame is an all route explorer frame, the algorithm then enters block 142 where it executes the tests set forth therein.

If the response from block 142 is positive, the algorithm then enters block 144 where the frame is copied. If the responses from block 138, 140 and 142 are negative, the algorithm descends into block 146. In block 146, the algorithm tests to see if the SPN TREE EXP bit is set for 1. If the bit is set for 1, the algorithm enters block 148 where it checks to see if it is single routes. If it is single routes, the algorithm enters block 150 where it checks to see if the condition set forth therein is satisfied. The algorithm then enters block 152 if the result in block 150 is positive and copies the frame. If the responses from blocks 146, 148 and 150 are negative, the frame is aborted block 154.

As can be seen from the above description, by using the simple decision tree set forth in the flowchart above, the LAN frame can be copied to the correct output port with very little overhead on a per port basis.

The representation of the decision tree in the form of pseudo code is set forth in TABLE IV. By using the flowchart and/or the pseudo code, the Copy Ctrl. 47 (FIG. 2) can be designed in hardware logic, software or a combination of both.

and Abort bits are set by the input port logic based on the current portion of the LAN frame that is being transferred. As a consequence, the entire frame or only a part of the frame can be sent on the LAN Switch Bus 24. In the down view section 28 of the module, a copy decision logic for an output port copies the frame based upon its setting and the contents of the LAN Switch Header. Once the frame is copied, it is transferred to the appropriate port. This concludes the detailed description of the present invention.

While this invention has been described in conjunction with specific embodiment thereof, it is obvious that many alternatives, modifications and variations will be apparent to those skilled in the art. Any and all of these changes are considered to be in the spirit and scope of the invention as defined in the following claims.

We claim:

1. A module for use in a network device including:

an input section including input circuit arrangement for generating appropriate LAN Switch (LS) Headers based upon information identifying a source port with which the module is associated, information stored at the source port representing configuration parameters of the source port and a current portion of a frame being

TABLE IV

```
| IF LAN_FRAME_TYPE &
    ((DIRECTED_FRAME & TARGET_PORT=THIS _PORT)                                                         |
      (COPY_IF_SRC_PORT_MATCH & SOURCE_PORT=SOURCE_MONITOR)                                            |
      (!DIRECTED_FRAME & DESTINATION_VLAN(SOURCE_VLAN)=1        &
       (ECHO_FRAMES | SOURCE_PORT!=THIS_PORT)                   &
         ((COPY_IF_NOTIFY_1 & N1_BIT=1)          |
           (COPY_IF_NOTIFY_2 & N2_BIT=1)         |
           (F_BIT=1 &
            (   (COPY_ALL                                                    )   |
                (COPY_IF_DA_MATCH       & MAC_ADDRESS=DA)                        |
                (COPY_IF_RI_MATCH       & DEST_BR_RN=RIF          )              |
                (COPY_IF_ALL_STN        & DA=all ones     & EXP_B_FILT_BIT = B_FILT_BIT)    |
                (COPY_IF_GROUP          & DA=group addr   & EXP_B_FILT_BIT = B_FILT_BIT)    |
                (COPY_IF_FUNC_ADDR      & DA=func addr    & EXP_B_FILT_BIT = B_FILT_BIT)    |
                (COPY_IF_ARE            & ALL Routes      & EXP_E_FILT_BIT = E_FILT_BIT)    |
                (COPY_IF_STE            & Single Routes   & EXP_E_FILT_BIT = E_FILT_BIT))))))
      THEN IF (HEADER_ONLY=1)       THEN Copy Only First Transfer
                                    ELSE Copy Entire Frame
      ELSE Ignore Frame
```

Referring again to FIG. 2B, the microprocessor view section 30 includes a microprocessor interface 156 that communicates with FRUs via microprocess interface (UP-I/F) 42 in each FRU. The microprocessor interface 156 is coupled to microprocessor bus interface 158. The microprocessor bus interface 158 is the interface into microprocessor 160. The microprocessor 160 is coupled to a memory module 162 and external interface (I/F) 164.

In operation, a LAN frame from a port connected to up view section 26 is received from a LAN and is partitioned into appropriate sectors or sections. In the preferred embodiment of the present invention, the frame is sectored into 64 bytes sector and stored in the ping pong buffers shown in storage means 34 (FIG. 2). A LAN Switch Header (LS Header) is generated and concatenated to the frame sector and is outputted on the LAN Switch Bus 24. Most of the values for the header are copied from configuration registers (not shown in order to simplify the Figure) associated with each of the input ports on the up view section 26. For example, each input port is assigned a unique source port number which is used for all frames that come from this input port. The VLAN ID, Forward Frame, Notification 1 and 2, Speed and Broadcast and Explorer filtered values are direct copies of configuration parameters. The Begin, End transmitted and appending the LS Headers to the current portion of the frame and forwarding the Header and appended portion of the frame;

an output section including output circuit arrangement for interrogating the LS Headers affixed to blocks of the frame and copying frame blocks based upon information in the LS Header and information stored at output ports representing configuration parameters of said output ports.

2. The module of claim 1 further including at least one Medium Access Control (MAC) controller for processing frames in accordance with a predetermined communications protocol coupled to the input section and output section.

3. The module of claim 1 further including a microprocessor section having a microprocessor bus interface for connecting to a microprocessor.

4. The module of claim 3 further including a microprocessor interface ($\mu$P I/F) for communicating with the input section.

5. The module of claim 2 wherein the at least one MAC controller process frames in accordance with year 2000 IEEE 802.5 communications protocol.

6. The module of claim 2 wherein the at least another MAC controller process frames in accordance with year 2000 IEEE 802.3 communications protocol.

7. The module of claim 2 wherein the predetermined communications protocol includes ethernet.

8. An apparatus for interconnecting communications network including;

a housing;

a switch fabric disposed in said housing;

a plurality of ports mounted in said housing;

at least one Frame Processing Unit (FPU) for connecting at least one port to the switch fabric, wherein said FPU including a first circuit arrangement for generating LAN Switch Headers based upon an input port configuration parameters and a block of a frame being transferred, appending selected ones of the LAN Switch Header to selected blocks of the frame and forwarding the LAN Switch Header and concatenated blocks of frame to the switch fabric and a second circuit arrangement for receiving LAN Switch Headers and concatenated blocks of frame, examining each of the LAN Switch Headers and copying blocks of frame based upon LS Header Information and output ports parameters.

9. An apparatus for interconnecting communications network including;

a housing;

a switch fabric disposed in said housing;

a plurality of ports mounted in said housing;

at least one Frame Processing Unit (FPU) for connecting at least one port to the switch fabric, wherein said FPU including a first circuit arrangement for generating LAN Switch Headers based upon an input port configuration parameters and a block of a frame being transferred, appending selected ones of the LAN Switch Header to selected blocks of the frame and forwarding the LAN Switch Header and concatenated blocks of the frame to the switch fabric and a second circuit arrangement for receiving LAN Switch Headers and concatenated blocks of the frame, examining each of the LAN Switch Headers and copying blocks of the frame based upon LS Header information and output ports configuration; and a controller coupled to the switch fabric.

10. The apparatus of claim 8 wherein the switch fabric includes a bus.

11. The apparatus of claim 9 wherein the controller includes a microprocessor.

12. The module of claim 1 further including a Microprocessor Interface ($\mu$P I/F) operatively positioned within said input section.

13. A method for routing data between stations connected to different ports of a switch comprising the acts of:

(a) receiving a frame;

(b) partitioning the frame into blocks;

(c) generating an appropriate header for routing each block said header being dynamic with contents changeable to at least indicate the block being transmitted, action to be taken on the block and information relative to configuration parameters of a receiving port;

(d) appending the appropriate header to a corresponding block;

(e) forwarding to a switch fabric within said switch the corresponding block and appended header;

(f) receiving from the switch fabric switch data units, including the corresponding block and appended dynamic header;

(g) examining the header; and (h) copying data units based upon states of bits in corresponding headers and information stored at output ports indicating configuration parameters of said output port.

14. A method for routing data between stations connected to different ports of a switch comprising the acts of:

(a) receiving a frame;

(b) partitioning the frame into blocks;

(c) generating an appropriate header for routing each block said header being dynamic with contents changeable to at least indicate the block being transmitted, action to be taken on the block, information relative to configuration parameters of a receiving port;

codes to at least indicate header format, source port number, target port number, source port speed, portion of frame being transmitted and abort frame or filtering has been done;

(d) appending the appropriate header to a corresponding block; and (e) forwarding to a switch fabric within said switch the corresponding block and appended header.

* * * * *